(12) United States Patent
More et al.

(10) Patent No.: US 6,799,930 B1
(45) Date of Patent: Oct. 5, 2004

(54) QUICK RELEASE NUT

(75) Inventors: Nicholas More, Felton (GB); John Nigel Walton, Morpeth (GB)

(73) Assignee: Torque Tension Systems Limited, Bedlington (GB)

(*) Notice: Subject to any disclaimer, the term of this patent is extended or adjusted under 35 U.S.C. 154(b) by 0 days.

(21) Appl. No.: 10/031,272

(22) PCT Filed: Apr. 25, 2000

(86) PCT No.: PCT/GB00/01430
§ 371 (c)(1),
(2), (4) Date: Oct. 26, 2001

(87) PCT Pub. No.: WO00/65243
PCT Pub. Date: Nov. 2, 2000

(30) Foreign Application Priority Data

Apr. 27, 1999 (GB) .............................. 9909523

(51) Int. Cl.[7] .............................................. F16B 37/08
(52) U.S. Cl. ...................... 411/433; 411/278; 411/348
(58) Field of Search ................ 411/432, 437, 411/433, 539, 540, 348, 277, 278

(56) References Cited

U.S. PATENT DOCUMENTS

| | | |
|---|---|---|
| 2,377,581 A | 6/1945 | Shaffrey |
| 4,556,352 A | 12/1985 | Resnicow |
| 5,000,640 A | 3/1991 | Haas, Jr. |
| 5,032,048 A * | 7/1991 | Walton et al. .............. 411/433 |

FOREIGN PATENT DOCUMENTS

| | | |
|---|---|---|
| DE | 32 28 646 A1 | 7/1982 |
| EP | 0 408 239 A1 | 4/1990 |
| GB | 855037 | 10/1957 |
| GB | 1 520 555 | 9/1976 |

* cited by examiner

Primary Examiner—Lynne H. Browne
Assistant Examiner—Jori Schiffman
(74) Attorney, Agent, or Firm—Jack Schwartz & Associates

(57) ABSTRACT

A quick release nut (1) includes a pair of body members or segments (2, 3) having internal surfaces (4) to be placed around and engage the shaft of a bolt. The segments (2, 3) are movable between an operative position and an inoperative position in which the segments (2, 3) are spaced further apart. A pin (8) and quick release cartridge (15) on segment (2) slide within corresponding channels (12, 18) in segment (3), and a pair of ball bearings (25, 26) are released from the groove (28) by pushing the end of pin (21) axially relative to the quick release cartridge (15).

8 Claims, 2 Drawing Sheets

QUICK RELEASE NUT

BACKGROUND OF THE INVENTION

1. Field of the Invention

The present invention relates to quick release nuts, and relates particularly, but not exclusively, to quick release nuts for use in hydraulic tensioning of bolts.

2. Description of the Prior Art

Tensioned bolts are used in many applications, such as connections between flanges at the ends of adjacent lengths of pipeline. The bolt is tensioned by means of a hydraulic bolt tensioning tool, and a nut is screwed onto the bolt while under tension. The bolt tensioning tool has a hydraulic piston which act on a reaction member in the form of a reaction nut screwed onto the free end of the bolt and which grips the bolt. The bolt is extended when axial pressure is applied to the nut by means of the tensioning tool, and when the hydraulic pressure operating within the tensioning tool is released, the bolt contracts to effect a secure connection.

The length of that part of the bolt protruding beyond the hydraulic bolt tensioning tool can be significant, which can cause difficulties if the reaction nut must be screwed onto the bolt, or removed from it after the connection using a tensioned bolt has been made. This is especially so in the case of damaged or rusted threads, or hostile environments such as undersea applications, where this process becomes time consuming and therefore expensive.

An attempted solution to this problem is disclosed in U.S. Pat. No. 4,438,901 and GB2143608, in which bolt tensioners incorporating a collet with radially displaceable segments are provided. However, bolt tensioners of this type suffer from the drawback that they are mechanically complex and difficult to use because of their bulk and weight.

GB2193549 and EP0408239 disclose prior art nuts for use with bolt tensioning tools and in which a split reaction nut is provided. The split nut has a surface engaged by a corresponding surface on the piston of the hydraulic cylinder/piston assembly of the bolt tensioning tool and is provided in two halves which can be moved apart to enable easier mounting to and removal from the bolt.

In particular, the split nut of EP0408239 is provided with a pair of guide pins along which the two halves of the split nut are slidable relative to each other between an inoperative position in which segments are spaced radially apart and an operative position in which the segments form a nut which can engage the thread of the bolt. The segments are biassed towards their inoperative position by means of coil springs mounted on the guide pins which react between end faces of the segments, and are held in their operative position by means of ball bearings provided in the segments which are urged by means of a coil spring into engagement with a circumferential groove in the guide pins.

This prior art split nut suffers from the disadvantage that the force retaining the segments in their operative position is dependent upon the resilience and adjustment of the coil spring, as a result of which it is often difficult to effect positive and repeatable engagement of the ball bearings in the groove. Also, a significant force needs to be applied to disengage the segments from each other towards the inoperative position, as a result of which disengagement of the halves of the nut from their operative position becomes difficult.

Preferred embodiments of the present invention seek to overcome the above disadvantages of the prior art.

SUMMARY OF THE PRESENT INVENTION

According to the present invention, there is provided a quick release nut comprising:

a plurality of body members adapted to be placed around a shaft of a bolt and having a surface adapted to engage the shaft of the bolt, wherein said body members are movable between an operative position, in which said surface engages the shaft of the bolt in use, and an inoperative position in which said body members are spaced further apart from each other than in said operative position; and fastening means for fastening said body members in said operative position and comprising, for each pair of adjacent body members in a circumferential direction around said surface, at least one elongate sliding member provided on a body member of said pair and slidable in a respective first recess provided in the other body member of said pair, and at least one retaining member provided on at least one said sliding member of the or each said pair, wherein the or each said retaining member is adapted to engage a respective second recess in the corresponding first recess to releasably retain the body members in the operative position.

By providing retaining members provided on at least one sliding member of the or each pair of body members which are adapted to engage in corresponding second recesses in the first recesses, this provides the advantage of making the retaining means more accessible than in the case of the prior art. This provides the further advantage that the retaining force of the retaining members can be more easily adjusted, and releasing of the retaining members from the second recesses is simplified.

The surface may be substantially part-cylindrical.

The surface is preferably threaded.

The nut preferably further comprises a portion of tapering lateral width.

By providing a portion of tapering lateral width, this provides the advantage that the application of pressure by means of a correspondingly shaped surface on the bolt tensioning tool causes the body members to be urged towards each other, thus more tightly gripping the shaft of the bolt.

The nut may further comprise a respective first biassing means for urging the or each said retaining member into engagement with the corresponding second recess.

In a preferred embodiment, at least one said retaining member is a ball bearing received in a respective third recess in the corresponding sliding member.

In a preferred embodiment, at least one said sliding member comprises a pin slidably mounted in a respective housing, wherein the or each retaining member of said sliding member is released in use from the corresponding second recess by sliding said pin relative to said housing.

The nut may further comprise a respective second biassing means for urging at least one said pair of body members apart.

BRIEF DESCRIPTION OF THE DRAWING FIGURES

A preferred embodiment of the invention will now be described, by way of example only and not in any limitative sense, with reference to the following drawings, in which.

DETAILED DESCRIPTION OF THE INVENTION

Figure 1:
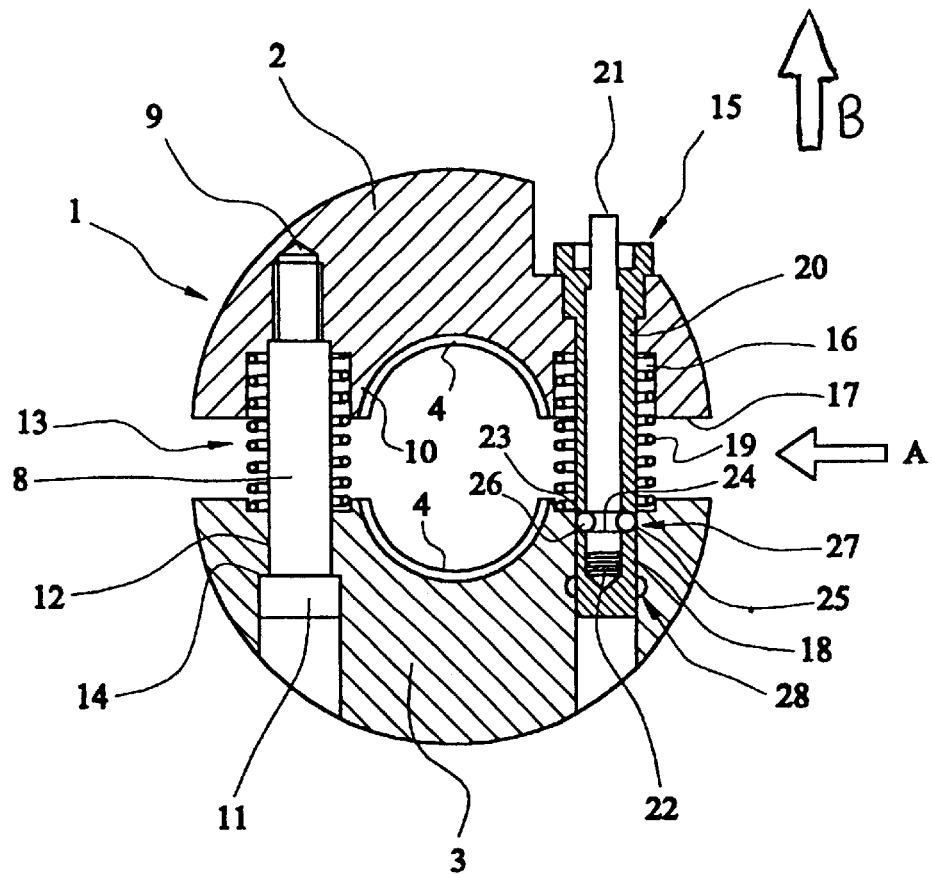
FIG. 1 is a cross-sectional plan view of a quick release nut embodying the present invention and in the inoperative position thereof.
Figure 2:
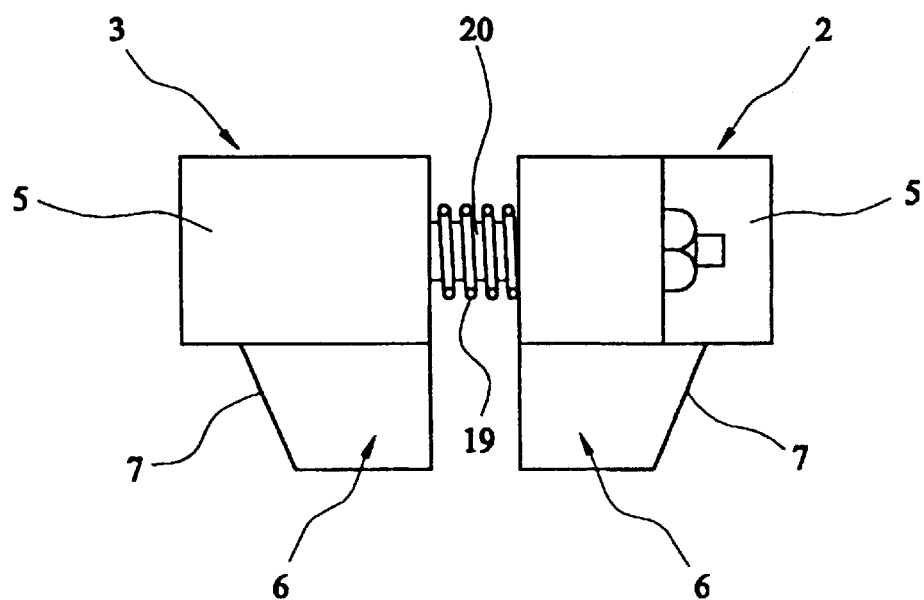
FIG. 2 is an elevation view of the nut of FIG. 1 along the direction of arrow A in FIG. 1.
Figure 3:
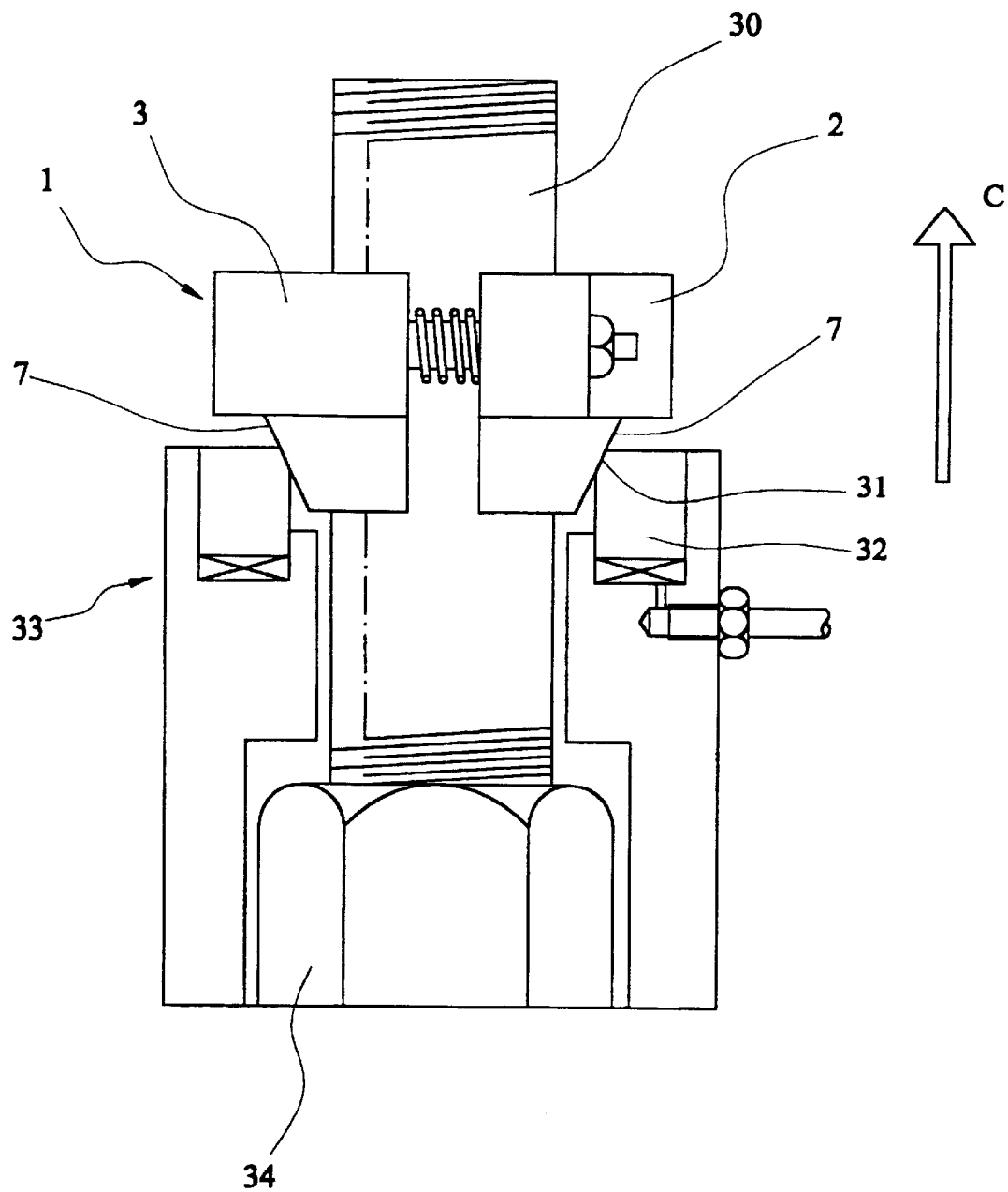
FIG. 3 is a schematic elevation view of a bolt tensioning tool using the nut of FIGS. 1 and 2.

Referring to FIGS. 1 and 2, a quick release nut 1 comprises a pair of opposed generally semicircular body portions or segments 2, 3, each of which has a generally semicircular, threaded internal surface 4. As shown in FIG. 3, the segments 2, 3 each have a generally semi-cylindrical upper part 5 and a lower part 6 having a tapering outer surface 7 of generally semi frusto-conical appearance.

A guide pin 8 is secured to a recess 9 in an end face 10 of segment 2 and projects outwardly from the end face 10. A head 11 of guide pin 8 can slide within a corresponding channel 12 in the other segment 3, and the segments 2, 3 are urged apart by a coil spring 13 until the head 11 of pin 8 abuts with a shoulder 14 of the channel 12 as shown in FIG. 1.

A quick release cartridge 15 is secured to a recess 16 and projects outwardly from a further end face 17 of segment 2 and is slidably received within a corresponding channel 18 in the other segment 3. The segments 2, 3 are also urged apart by means of a coil spring 19 located around the quick release cartridge 15 and received in recess 16.

The quick release cartridge 15 includes a hollow cylindrical housing 20 which accommodates a pin 21 urged in the direction of arrow B in FIG. 1 by means of coil spring 22. The pin 21 is provided with a circumferential groove 23 below which a generally frusto-conical abutment surface 24 is provided. A pair of ball bearings 25, 26 are received within the groove 23 and are aligned with one or more apertures 27 in the housing 20. The corresponding channel 18 in segment 3 is provided with a circumferential groove 28 for receiving the ball bearings 25, 26.

The operation of the nut 1 shown in FIGS. 1 and 2 will now be described.

In order to locate the nut on a bolt 30 (FIG. 3) the nut 1 is initially in the inoperative condition shown in FIGS. 1 and 2 in which the segments 2, 3 are spaced apart by means of coil springs 13, 19. As a result, the internal surfaces 4 of the segments 2, 3 are spaced apart and can therefore easily be located around the bolt 30.

At a position slightly above the desired position of the nut 1 on bolt 30, the segments 2, 3 are urged towards each other, as a result of which the pin 8 and housing 20 slide within channels 12, 18 respectively. When the ball bearings 25, 26 are not located opposite circumferential groove 28, they are prevented from moving radially outwardly from the corresponding apertures 27. When the housing 20 slide sufficiently far along channel 18 that the ball bearings 25, 26 are located alongside the groove 28, the ball bearings 25, 26 are moved outwardly from apertures 27 by means of abutment surface 24 urged upwardly by coil spring 22. This forces the ball bearings 25, 26 into engagement with the circumferential groove 28 to retain the housing 20 in position. This locks the nut 1 in its operative condition, in which the segments 2, 3 are spaced slightly apart.

Referring to FIG. 3, the nut 1 in its operative condition is then screwed further downwardly along the bolt 30 until the tapering outer surfaces 7 of segments 2, 3 engage a recess 31 in an end face of a piston 32 of a hydraulic bolt tensioning tool 33 which is located over a nut 34 to be tightened onto the tensioned bolt 30. Actuation of the tensioning tool 33 causes the piston 32 to be urged in the direction of arrow C shown in FIG. 3, as a result of which the surface of recess 31 urges the segments 2, 3 in the direction of arrow C, and towards each other into engagement with the thread of bolt 30. As the bolt 30 is tensioned, the nut 34 is tightened on the bolt 30.

When the pressure on the bolt tensioning tool 33 is released, the tensioned bolt 30 with the nut thereon forms a secure connection. The split nut 1 is then unscrewed sufficiently to disengage the tapering outer surfaces 7 from the recess 31. The nut 1 is then released from its operative condition by pressing the end of pin 21, which urges the pin 21 axially downwardly (as shown in FIG. 1) in the housing 20 against the action of coiled spring 22. This enables the ball bearings to again be located within the groove 23 in the pin 21 within housing 20, as a result of which the ball bearings 25, 26 no longer engage the circumferential groove 28 in segment 3. As a result, the segments 2, 3 can be urged apart by means of coiled springs 13, 19.

It will be appreciated by persons skilled in the art that the above embodiment has been described by way of example only and not in any limitative sense, and that various alterations and modifications are possible without departure from the scope of the invention as defined by the appended claims.

What is claimed is:

1. A quick release nut comprising:

a plurality of body members adapted to be placed around a shaft of a bolt and defining a surface adapted to engage the shaft of the bolt, wherein said body members are movable between an operative position, in which said surface engages the shaft of the bolt in use, and an inoperative position in which said body members are spaced further apart from each other than in said operative position; and at least one fastening device for fastening said body members in said operative position and comprising, for each pair of adjacent body members in a circumferential direction around said surface, at least one elongate sliding member provided on a body member of said pair and slidable in a respective first recess provided in the other body member of said pair, and at least one retaining member provided on at least one said sliding member of the or each said pair, wherein the or each said retaining member is adapted to engage a respective second recess in the corresponding first recess to releasably retain the body members in the operative position, at least one release device cooperating with the or each said retaining member and provided on the corresponding said sliding member, for enabling the or each said retaining member to be released from the corresponding second recess.

2. A nut according to claim 1, wherein the surface is substantially part-cylindrical.

3. A nut according to claim 1, wherein the surface is threaded.

4. A nut according to claim 1, further comprising a portion of tapering lateral width.

5. A nut according to claim 1, further comprising at least one first biassing device for urging the or each retaining member into engagement with the corresponding second recess.

6. A nut according to claim 1, wherein at least one said retaining member is a ball bearing received in a respective third recess in the corresponding sliding member.

7. A nut according to claim 1, wherein at least one said sliding member comprises a pin slidably mounted in a respective housing, and wherein the or each retaining member of said sliding member is released in use from the corresponding second recess by sliding said pin relative to said housing.

8. A nut according to claim 1, further comprising at least one second biassing device for urging at least one said pair of body members apart.

* * * * *